United States Patent [19]

Prevatt et al.

[11] Patent Number: 5,565,872
[45] Date of Patent: Oct. 15, 1996

[54] SYSTEM AND METHOD FOR DETECTING AND CHARACTERIZING VIBRATING TARGETS

[75] Inventors: Truman W. Prevatt, Sarasota, Fla.; Stacy L. Smith, Herndon, Va.

[73] Assignee: Loral Fairchild Corporation, Syosset, N.Y.

[21] Appl. No.: 428,826

[22] Filed: Apr. 25, 1995

[51] Int. Cl.$^6$ ............................................. G01S 7/292
[52] U.S. Cl. ................................... 342/193; 342/192
[58] Field of Search ........................... 342/90, 192, 193, 342/98, 102

[56] References Cited

U.S. PATENT DOCUMENTS

| | | | |
|---|---|---|---|
| 3,614,779 | 10/1971 | Sommer et al. | 342/192 |
| 4,209,786 | 6/1980 | Barley et al. | 342/193 |
| 4,673,940 | 6/1987 | Barley et al. | 342/192 |
| 5,073,780 | 12/1991 | Barley et al. | 342/192 |
| 5,424,749 | 6/1995 | Richmand | 342/192 |

OTHER PUBLICATIONS

Scheer, James A., James L. Kurtz, *Coherent Radar Performance Estimation*, Artech House Inc., 1993, pp. 253–257.

*Primary Examiner*—Ian J. Lobo
*Attorney, Agent, or Firm*—Sterne, Kessler, Goldstein & Fox P.L.L.C.

[57] ABSTRACT

A method and system for processing radar return signals reflected from a vibrating target to determine the actual vibration frequency and to isolate a characteristic vibration of the vibrating target, including an oscillation signature function (OSF). A radar signal processor receives a stabilized phase history which includes frequency components, namely an FM sideband corresponding to a modulation imparted upon a reflected radar return signal by the vibrating target. The radar signal processor detects the FM sideband and determines a candidate vibration frequency. The stabilized phase history is filtered at a phase rotation based on the candidate vibration frequency to isolate the OSF and to determine the actual vibration frequency. To distinguish the nearly identical frequency spectra produced by vibrating targets which vibrate at multiples of the radar system folding frequency, the stabilized input signal is further filtered at phase rotations corresponding to the candidate vibration frequency plus or minus multiples of the radar system folding frequency. By comparing the characteristic vibration or oscillation signature function with known information, the type of vibrating target, the identity of the vibrating target, and/or the state of the vibrating target can be determined. Further, the radar system can detect the actual vibration frequency and characteristic vibration of vibrating targets directly from the stabilized phase history prior to performing any image processing.

22 Claims, 13 Drawing Sheets

SYSTEM AND METHOD FOR DETECTING AND CHARACTERIZING VIBRATING TARGETS

BACKGROUND OF THE INVENTION

1. Field of the Invention

The present invention relates generally to detecting and characterizing vibrating targets. More particularly, the present invention is directed to a radar system and method for detecting the vibration frequency of vibrating targets and for determining a characteristic vibration of vibrating targets, including an oscillation signature function (OSF).

2. Related Art

Most radar systems are used to detect non-periodic motion and/or distance. The modulation of radar return signals from periodic motion, such as oscillation and/or vibration, typically is viewed as a distortion on the radar return signals. This distortion can lead to degraded performance of the radar system.

Conventional radar systems which detect vibrating targets typically detect ghost images, or paired echoes, after imaging. The imaging of the radar return signal requires signal processing to obtain a narrowband frequency spectrum. This signal processing typically attenuates or eliminates the frequency components induced by vibration which degrades the radar system's capability to detect and characterize vibrating targets. Vibration information at frequencies exceeding the pulse rate frequency is lost through imaging.

What is needed is a system and method for detecting vibration frequency and characterizing a vibrating target directly from the stabilized phase history of a radar return signal.

SUMMARY OF THE INVENTION

The present invention is an enhancement to a radar system that enables the radar system to detect and characterize vibrating targets. The present invention provides a radar signal processor that detects vibrating targets, determines the actual frequency of vibrating targets, and isolates a characteristic vibration, termed the "oscillation signature function" (OSF), of the target.

The present invention is concerned with the motion of the target; more specifically, the present invention is concerned with periodic motion. Periodic motion, for example motion caused by vibration, modulates the radar return in two ways. First, frequency is shifted due to changing positions of the target. Second, frequency is shifted due to the velocity component of the target vibration (the doppler effect). Both modulations result in narrowband FM modulation on the return pulse, which produces sidebands. The present invention takes advantage of the resulting sidebands to detect and isolate the vibrating target. The present invention further enhances conventional radar systems by detecting and characterizing a vibrating target prior to imaging.

Most typical radar systems include a modulator, a transmitter, a transmitting antenna, a receiving antenna, a deramp and motion compensator, and an amplifier. The modulator modulates a carrier signal. The transmitter amplifies the modulated carrier signal which is then propagated by the transmitting antenna. The propagated signal is reflected by potential targets and propagates back to the radar system.

The receiving antenna receives and transduces the reflected radar return signal. The deramp and motion compensator mixes the radar return signal with a delayed replica of the transmitted signal. Conventional systems which detect vibrating targets perform this detection after imaging.

Thus, in conventional radar systems, a radar return pulse is deramped and motion compensated, amplified and imaged. However, the signal processing that occurs during imaging attenuates or eliminates the frequency components induced by vibration. Therefore, the performance of systems that detect vibrating targets after imaging is degraded relative to the present invention.

According to the present invention, a radar signal processor or OSF detector receives a stabilized phase history of a radar return signal. The stabilized phase history includes frequency components, namely, an FM sideband, corresponding to a modulation imparted upon the radar return signal by the vibrating target. Preferably, the radar return signal is first deramped, motion-compensated, and amplified, but not imaged to provide a stabilized phase history directly to the radar signal processor.

According to a first embodiment of the present invention, the radar signal processing method and system detects the appropriate FM sideband from the stabilized phase history and determines a vibration frequency.

According to a second embodiment, the stabilized phase history is filtered at a phase rotation based on the detected vibration frequency of the vibrating target. A coherent signal is subsequently output representing the characteristic vibration of the vibrating target when the filter phase rotation corresponds to the actual vibration frequency.

According to a third embodiment of the present invention, to distinguish between radar return signals having nearly identical frequency spectra due to aliasing in the frequency spectrum, the stabilized phase history of the radar return signal is filtered at phase rotations corresponding to a candidate vibration frequency plus or minus multiples of the radar system folding frequency. A coherent signal is subsequently detected. This detected coherent signal represents the characteristic vibration of the vibrating target when the filter phase rotation corresponds to the actual vibration frequency. In this manner, information regarding the actual vibration frequency and the characteristic vibration of the vibrating target is obtained regardless of aliasing.

According to a further feature of the above first to third embodiments, the radar processing method and system of the present invention can detect the actual vibration frequency and characteristic vibration of vibrating targets without first imaging the stabilized phase history of the radar return signal.

According to a further feature of the second and third embodiments, by comparing the characteristic vibration or oscillation signature function with known information, the type of vibrating target, the identity of the vibrating target, and/or the state of the vibrating target can be determined.

Further embodiments, features, and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview and Discussion of the Invention

The present invention provides a method and system for processing returning carrier signals reflected from a vibrating target to determine the vibration frequency and to isolate a characteristic vibration, also referred to herein as the oscillation signature function (OSF), of the vibrating target. To distinguish aliasing or folding, the return carrier signal is filtered at phase rotations corresponding to a detected candidate vibration frequency plus or minus multiples of the system folding frequency. In this manner, frequency components in the return carrier signal can be detected at an improved signal-to-noise ratio prior to imaging. Information on the type of vibrating target, the identity of the vibrating target, and/or the state of the vibrating target can be determined from the isolated OSF.

2. Example Environment

The present invention is described in the example environment of a pulsed radar system. In the example environment a pulsed radar detection system is deployed on an airborne vehicle to detect vibrating ground targets. For instance, a surveillance airplane can use the present invention in a radar system to detect vibrations associated with idling engines in ground vehicles such as tanks. In this manner, tank decoys can be distinguished.

Figure 1A:
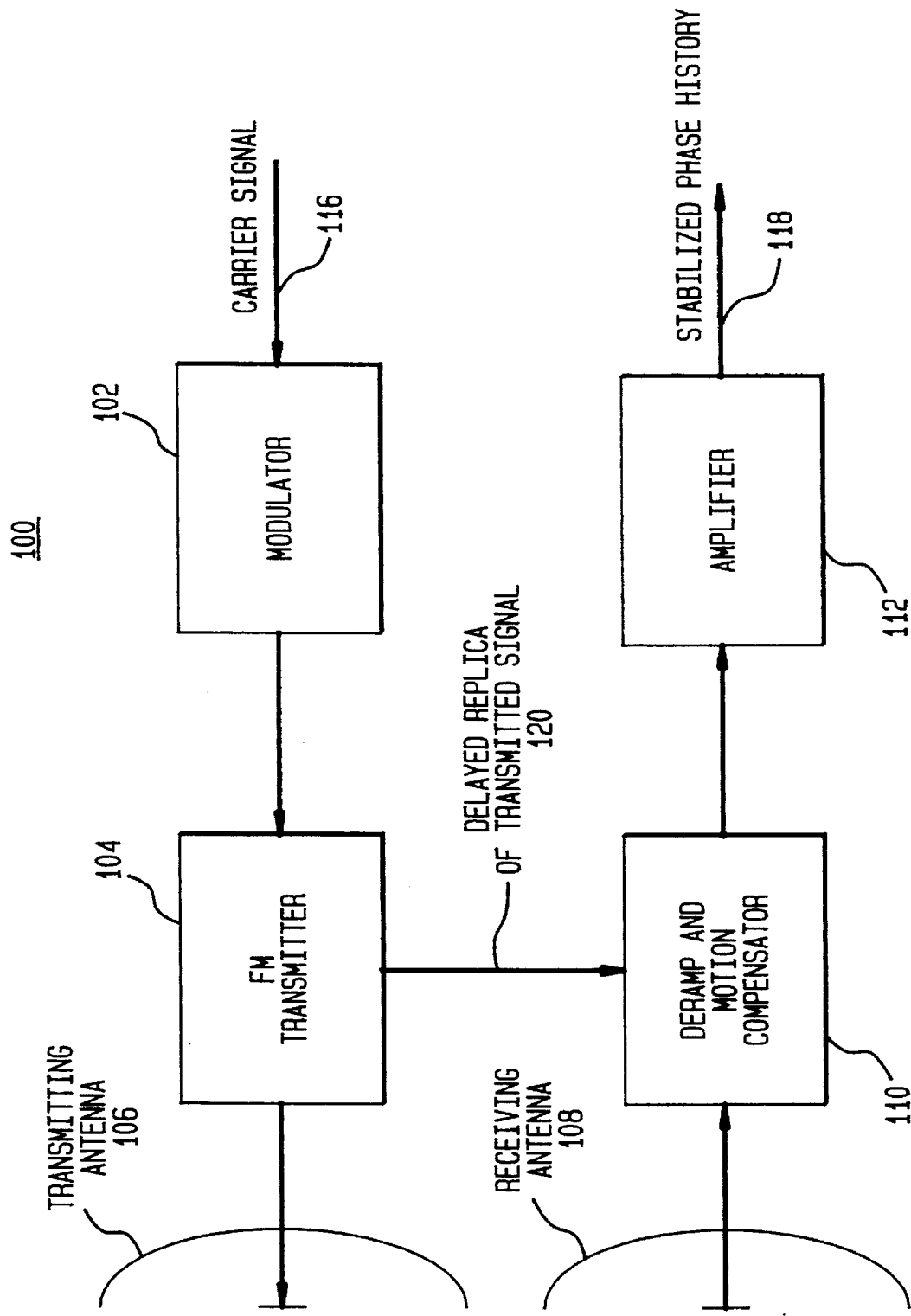
FIG. 1A is a block diagram of a conventional radar system.

FIG. 1A is a block diagram of a conventional radar system 100 for obtaining a stabilized phase history 118. This stabilized phase history 118 includes frequency components corresponding to the distinctive modulation imparted upon a reflected radar return signal by a vibrating target (not shown).

Radar system 100 includes a modulator 102, a frequency modulation FM transmitter 104, a transmitting antenna 106, a receiving antenna 108, a deramp and motion compensator 110, and an amplifier 112. For example, the radar system can be comprised of, but is not limited to, a coherent linear FM radar system.

Generally, radar system 100 is comprised of a transmitting antenna 106 for propagating radar signals to a vibrating target and a receiving antenna 108 for receiving a return signal reflected from the vibrating target. An FM transmitter 104 drives the transmitting antenna 106 to transmit an FM transmission having a carrier signal 116 imparted by the modulator 102. For example, carrier signal 116 can be a pulsed 10 megahertz MHz sinusoid having a pulse width 7.5 microseconds and a pulse repetition frequency of 2,000 pulses per second.

If a target is present, the transmitted radar signal hits the target and is reflected back to radar system 100. This reflected radar return signal provides information about the position, distance and motion of a vibrating target.

Receiving antenna 108 receives and transduces the radar return signal. The radar return signal is mixed with a delayed replica 120 of the transmitted signal by deramp and motion compensator 110. The radar return pulse is then frequency and phase shifted for a candidate location by deramp and motion compensator 110 and amplified by amplifier 112 to produce the stabilized complex phase history 118 of the radar return signal. Alternatively, this separation of the stabilized complex phase history from the real component in a radar return signal can occur prior to deramp and motion compensation or after amplification.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments such as continuous-wave radar or acoustic-wave detection systems.

Vibration Frequency and Oscillation Signature Function Detector

According to the present invention, the stabilized complex phase history 118 from a conventional radar system 100 is further processed to detect the vibration frequency and OSF of a vibrating target. To understand how vibration frequency and OSF information are determined from the stabilized phase history 118, it is helpful to first consider the content of the stabilized phase history 118 in more detail.

The stabilized complex phase history of the radar return signal can be described as having two components, a DC component associated with the average position of the reflector and FM sidebands associated with the modulation imparted by the target's vibration. These FM sidebands of the stabilized phase history are the characteristic vibration of the target, that is, the oscillation signature function (OSF). More specifically, in a pulsed radar system, the OSF is a sampled version of the characteristic vibration of the target with a sampling rate equal to the pulse repetition frequency.

Figure 1B:
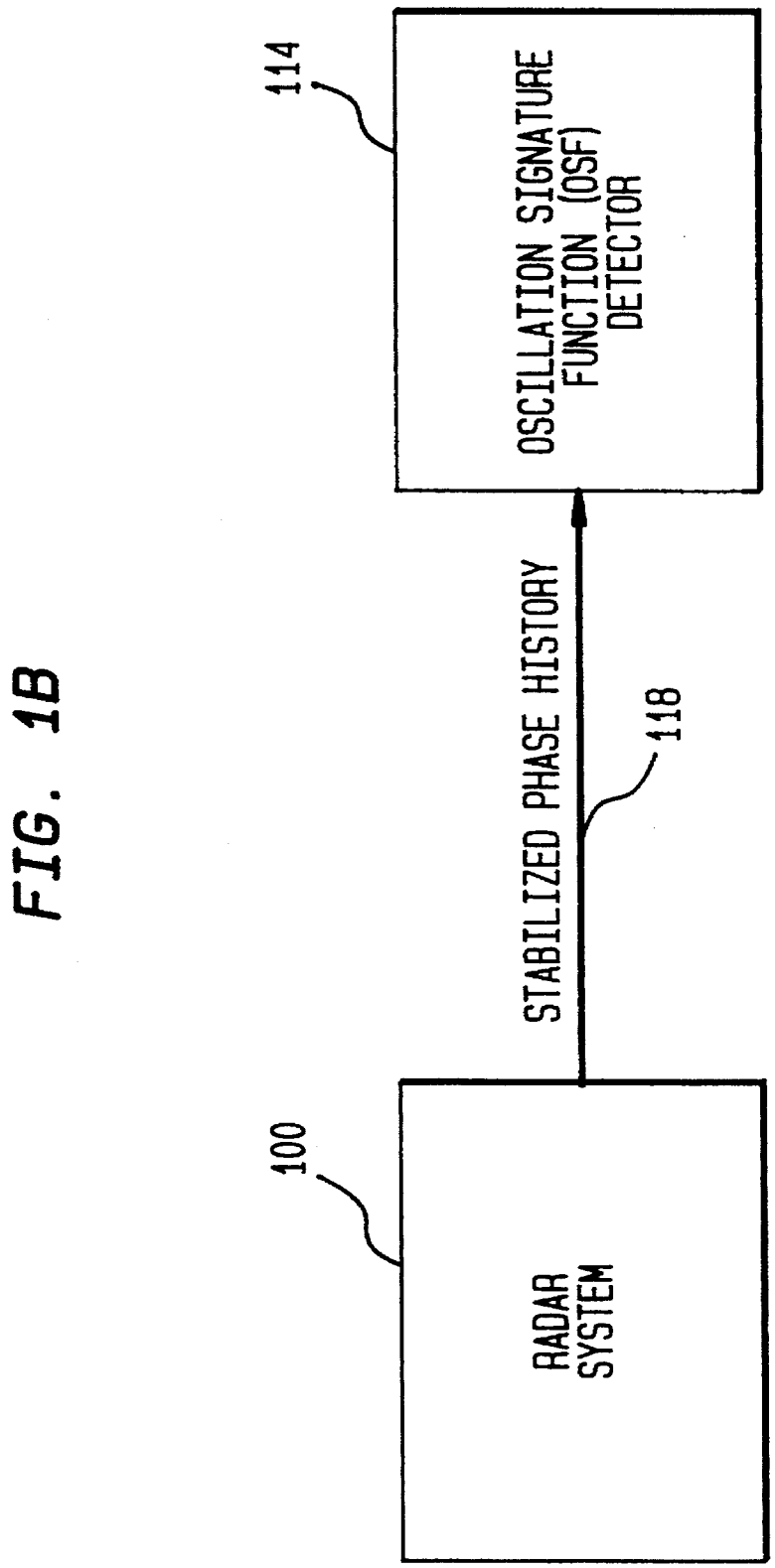
FIG. 1B is block diagram of an example radar system with an oscillation signature function detector in accordance with the present invention.

FIG. 1B is a block diagram generally illustrating implementation of an OSF detector 114 with the radar system 100. As shown in FIG. 1B, radar system 100 outputs the stabilized phase history 118 of the radar return signal to OSF detector 114. OSF detector 114 then detects the actual vibration frequency and isolates a characteristic vibration or OSF for the vibrating target by directly detecting FM sidebands in the stabilized phase history 118, as will be explained in detail below with respect to FIGS. 2, 3, and 4A to 4C.

Figure 2:
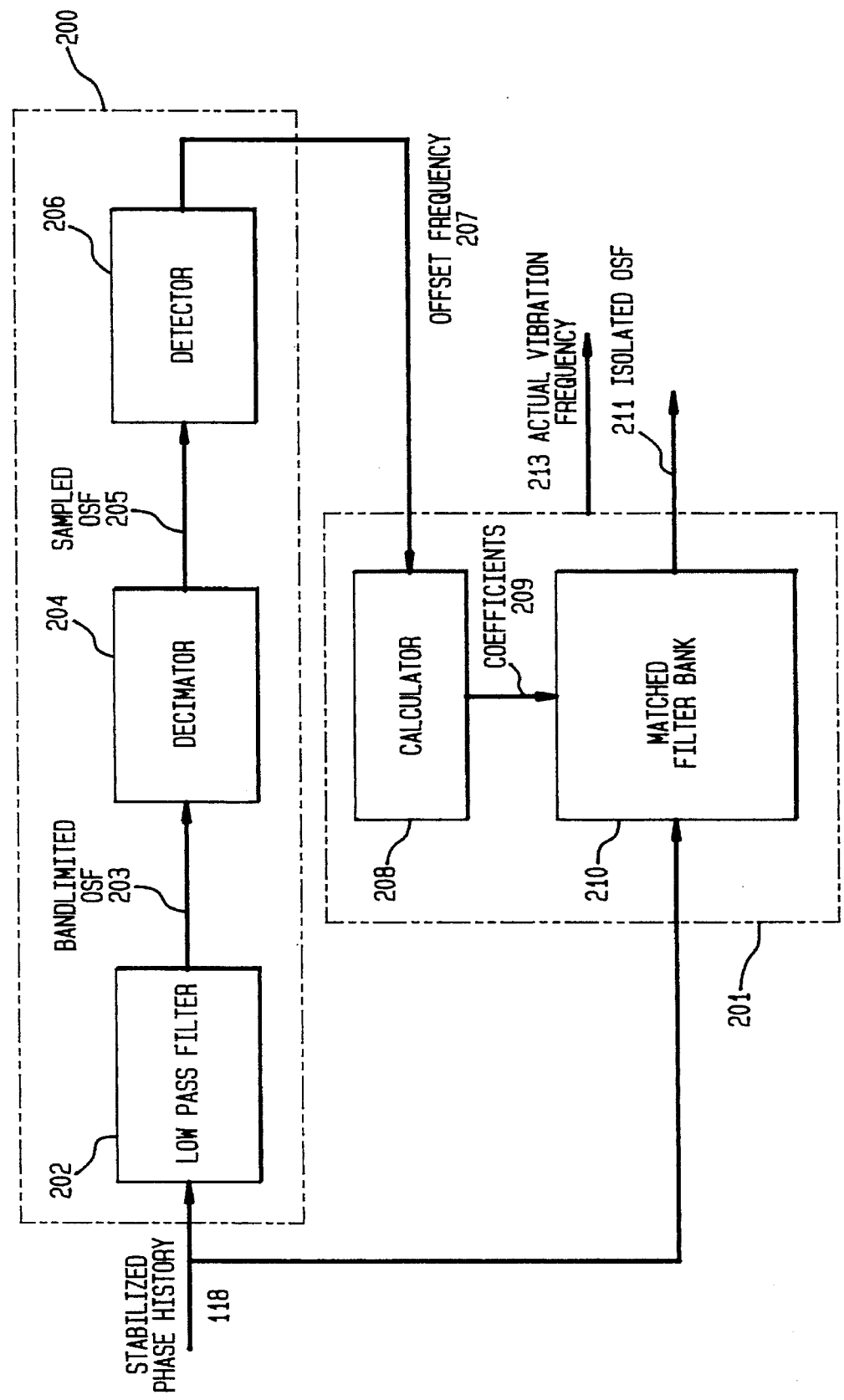
FIG. 2 is a block diagram of an oscillation signature function detector in accordance with the present invention.

FIG. 2 is a block diagram of OSF detector 114 in accordance with the present invention. OSF detector 114 includes a signal processing block 200 for detecting frequency components of an FM vibration sideband and a signal processing block 201 for isolating the oscillation signature function (OSF). Frequency detection block 200 includes a lowpass filter 202, a decimator 204, and a detector 206. OSF isolation block 201 includes a calculator 208 and a matched filter bank 210.

Figure 3:
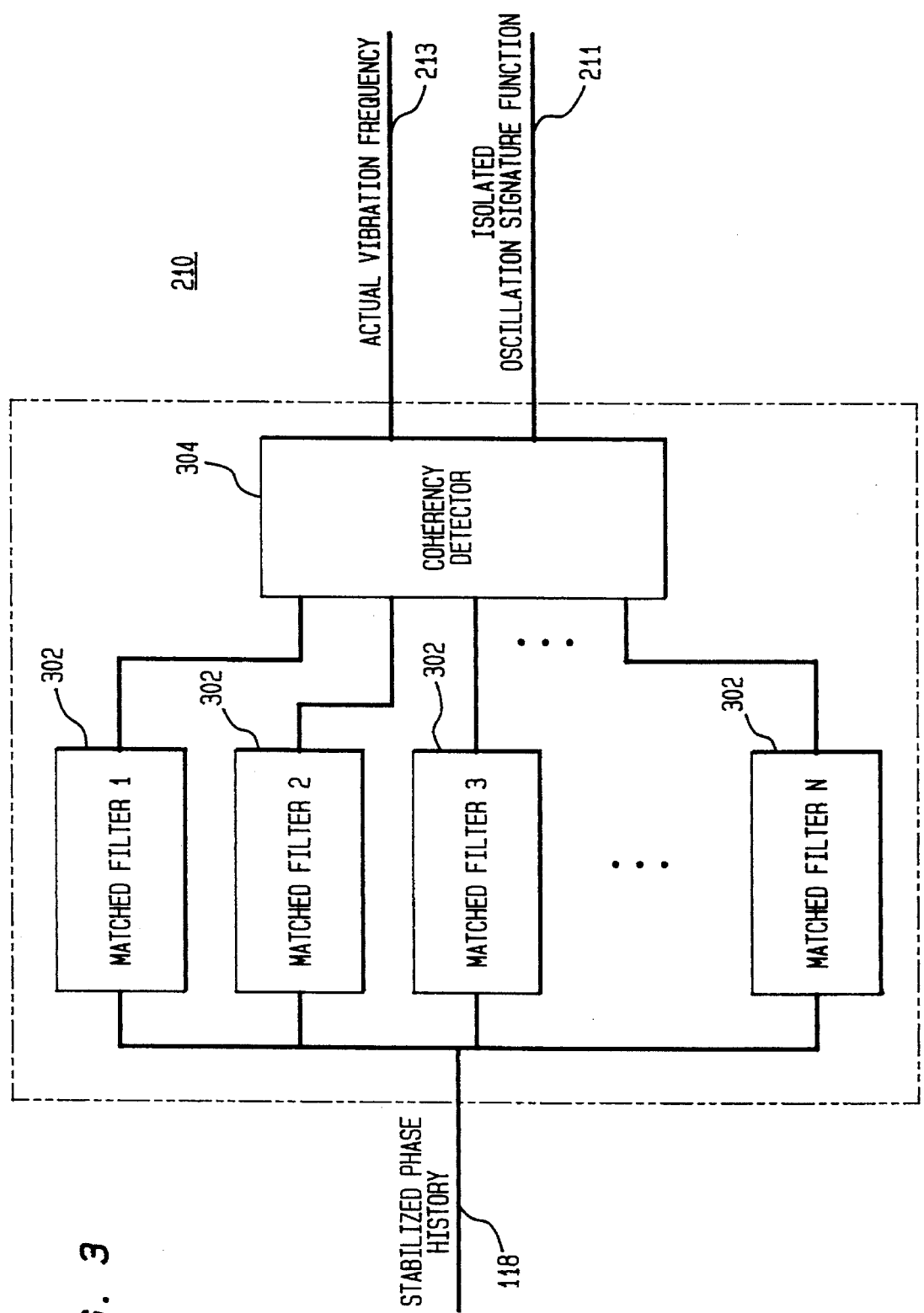
FIG. 3 is a block diagram of a matched filter bank and coherency detector in accordance with the present invention.

FIG. 3 is block diagram illustrating the constituent parts of matched filter bank 210. As shown in FIG. 3, matched filter bank 210 includes a number N of matched filters 302 and a coherency detector 304.

Figure 4A:
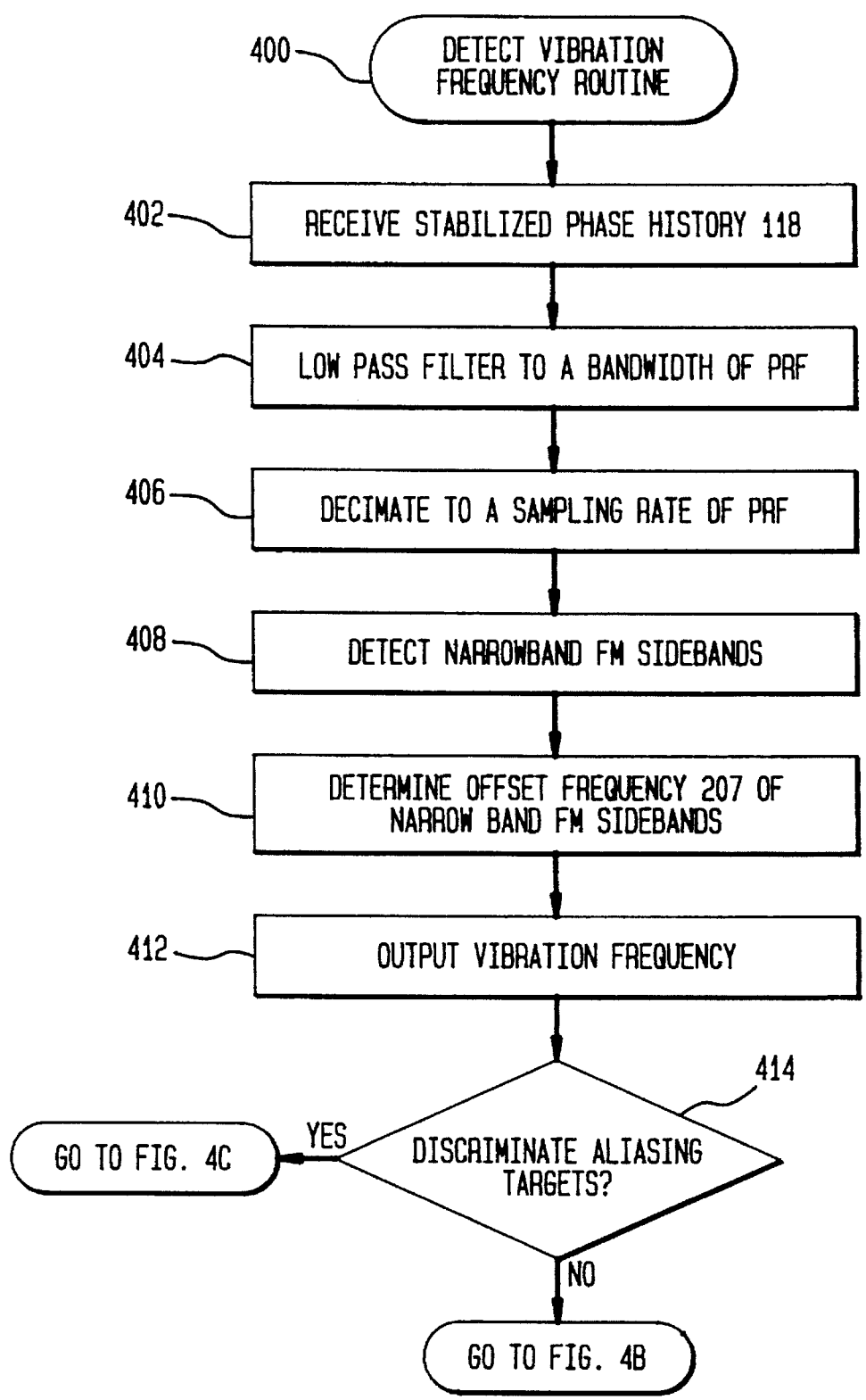
FIGS. 4A to 4C are flow diagrams illustrating the operation of the oscillation signature function detector of FIG. 2.
Figure 4B:
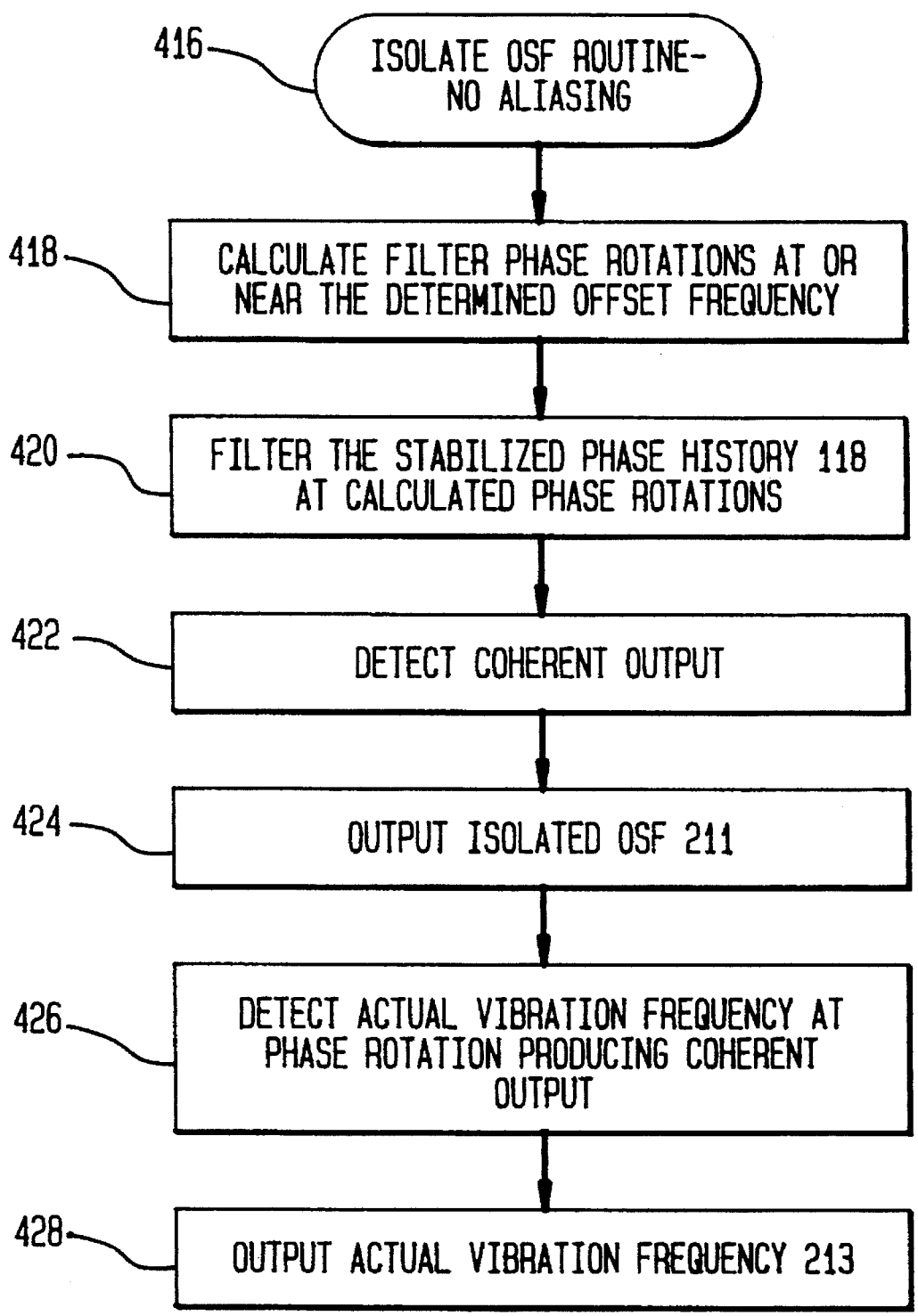
Figure 4C:
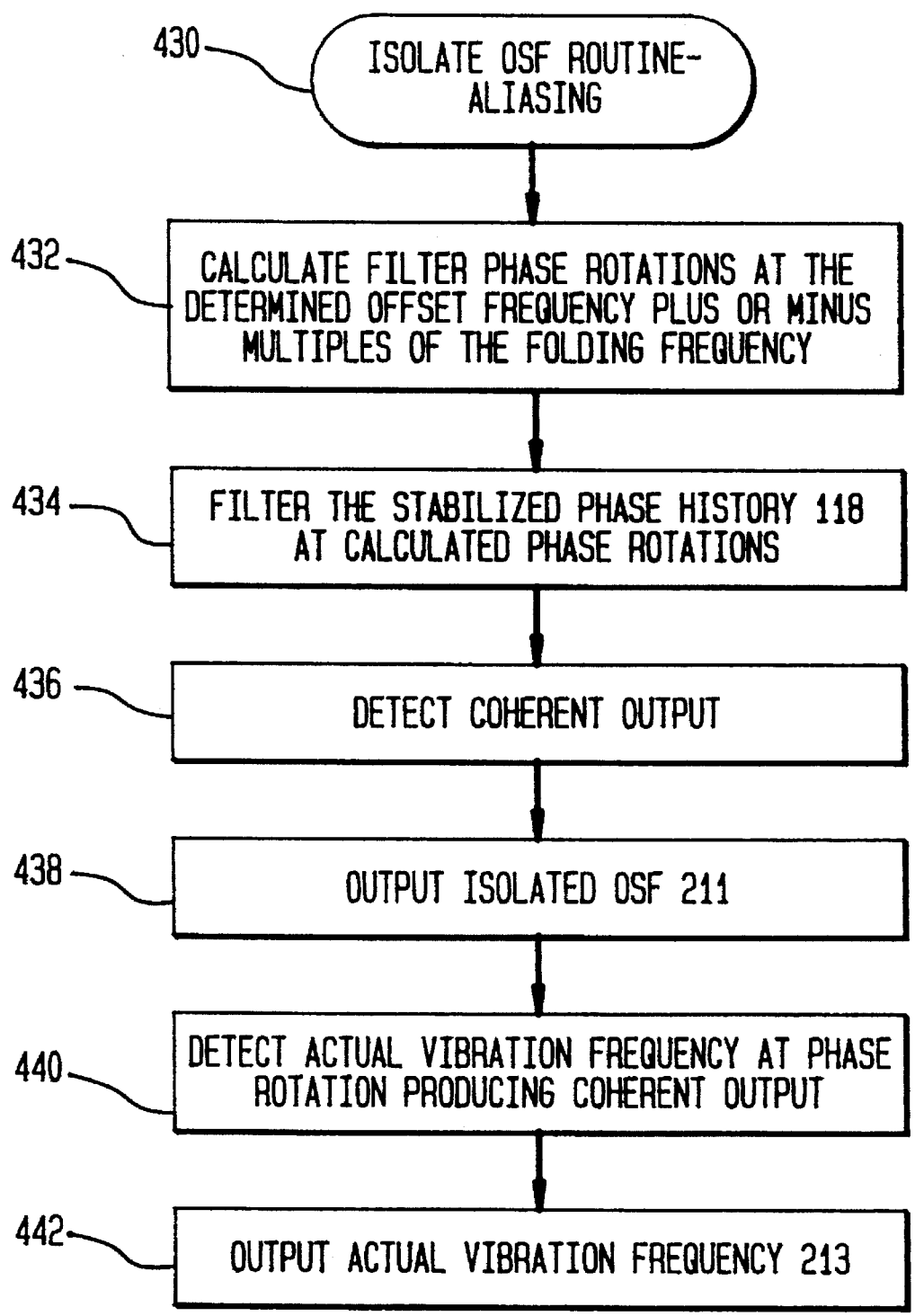

FIGS. 4A to 4C illustrate routines for carrying out vibration frequency and OSF detection according to the present invention.

Explanation of Embodiments of the OSF Detector Operation

The operation of the OSF detector 114 and the matched filter 210, shown in FIGS. 2 and 3, respectively, is now described with reference to the corresponding routines in FIGS. 4A to 4C. In particular, three embodiments of the present invention are explained in detail.

The first embodiment of the invention relates to detecting a vibration frequency from the stabilized phase history of a vibrator. See the frequency detection block 200 in FIG. 2 and the frequency detection routine 400 in FIG. 4A, steps 402 to 412.

The second and third embodiments include frequency detection to detect an offset vibration frequency as in the first embodiment, but further include the step of filtering the stabilized phase history to isolate the oscillation signature function (OSF). In the second embodiment, the stabilized phase history is filtered at a phase rotation at or near the detected offset vibration frequency to isolate the OSF 211, and to verify the actual vibration frequency 213. See the OSF isolation block 201 in FIG. 2 and the "Isolate OSF—No Aliasing" routine in FIG. 4B. In the third embodiment, however, filtering is performed at phase rotations corresponding to the detected offset vibration frequency and to the detected candidate vibration frequency plus or minus multiples of a folding frequency of the carrier signal to isolate the OSF 211.

The third embodiment further detects an actual vibration frequency 213—even for vibrating targets which alias at the same frequencies. See the OSF isolation block 201 in FIG. 2 and the "Isolate OSF—Aliasing" routine in FIG. 4C.

First Embodiment—Frequency Detection

According to the first embodiment of the present invention, the vibration frequency of a vibrating target is detected from its stabilized phase history. As evident from the frequency detection block 200, shown in FIG. 2, and the frequency detection routine 400, shown in FIG. 4A, the stabilized phase history 118 is first input to low pass filter 202 (step 402).

Low pass filter 202 bandlimits the stabilized phase history 118 at the pulse rate frequency PRF of the radar system (step 404). This bandlimiting frequency is chosen to eliminate the signal energy above the folding frequency of the radar system. Bandlimited OSF signal 203 is then output to decimator 204.

For example, in a system where the pulse repetition frequency of the carrier signal 116 is 2000 pulses per second, the limiting frequency is 2000 Hz. The folding frequency is then 2 kilohertz (kHz), and low pass filter 202 bandlimits stabilized phase history signal 118 to a 2 kHz frequency range, +1 to −1 kHz, for this complex signal.

Next, the bandlimited OSF 203 is resampled by decimator 204. Decimator 204 samples at a sampling rate equal to the pulse rate frequency (step 406). In the above example where the pulse rate frequency of carrier signal 116 is 2,000 pulses per second, the sampling rate of decimator 204 is 2000 samples per second. A sampled OSF signal 205 is then provided to detector 206.

Detector 206 detects the narrowband FM vibration sidebands of the vibrating target from the sampled OSF 205 (step 408). Well-known statistics processing, optimized for the detection of such narrowband signals associated with narrowband FM modulation in white Gaussian noise, such as Fast Fourier Transform or maximum entropy, can be utilized. For example, the sampled OSF 205 from decimator 204 can be transformed by Fast Fourier Transform into the frequency domain to obtain a frequency spectrum of the vibrating target having a central peak at DC. A peak check is then performed to determine the presence of associated, symmetric FM sidebands about said central DC peak.

After detecting an FM vibration sideband, the detector 206 determines the offset frequency between the FM sideband and DC (step 410). This determined offset frequency 207 is the absolute value of the offset between the frequency at the central DC peak and the frequency at the nearest, symmetric FM sideband that corresponds to the modulation imparted on the radar return signal by the vibrator. See, e.g., FIG. 8 which shows FM sidebands 804 offset from a central DC peak 802 for a 40 Hz vibrator.

According to the first embodiment of the present invention, then, this determined offset frequency 207 is output directly as the vibration frequency of the target (step 412). In this manner, the vibration frequency of the vibrating target is detected from the stabilized phase history 118 prior to imaging.

The determined offset frequency 207 is essentially a candidate vibration frequency of the vibrating target. Thus, the second and third embodiments include further processing to isolate the OSF 211 and to determine the actual vibration frequency 213 of the vibrating target. The third embodiment further allows aliasing vibrating targets to be distinguished as explained below.

In step 414, a check is made as to whether aliasing targets, that is, vibrators which alias at the same frequency producing near-identical frequency spectra, are to be discriminated. For instance, in applications where potential vibrating targets of interest vibrate at frequencies less than the pulse rate frequency, aliasing is not a concern. Consequently, if such aliasing is not to be discriminated, an Isolate OSF—No Aliasing routine 416 (FIG. 4B) according to the second embodiment is followed to isolate the OSF, otherwise, the Isolate OSF—Aliasing routine 430 (FIG. 4C) according to the third embodiment is followed.

Second Embodiment: Isolate OSF—No Aliasing

According to the second embodiment, the stabilized phase history 118 is filtered at a phase rotation by a signal processing block 201 to isolate the oscillation signature function (OSF) and to determine the actual vibration frequency (see FIGS. 2, 3, and 4B).

As shown in FIG. 2, signal processing block 201 includes a calculator 208 and Matched Filter Bank 210. FIG. 3 further illustrates in block form the constituent Matched Filters 302 and Coherency Detector 304 of an example matched filter bank 210.

The operation of the signal processing block 201 to isolate an OSF and verify a detected vibration frequency according to the second embodiment, will be described with reference to the Isolate OSF—No Aliasing Routine 416 in FIG. 4B.

First, calculator 208 receives the offset frequency 207 determined by detector 206, as described previously with respect to the first embodiment. Calculator 208 then calculates filter phase rotations at or near the determined offset frequency 207 (step 418). The stabilized phase history 118 is then filtered at the calculated phase rotations (step 420).

For example, in a matched filter bank 210, as shown in FIG. 3, step 420 can be carried out by programming each match filter 302 with a coefficient 209 to perform a phase rotation on the stabilized phase history 118 at selected frequencies equal to or near the offset vibration frequency. By using N matched filters 302 the filtering can be performed in parallel, however, as would be apparent to a person skilled in the art, the stabilized phase history 118 could be stored and then filtered at a phase rotation corresponding to the most likely candidate offset frequency 207. Filtering at other selected frequencies would then be performed, if necessary, until a coherent output is detected. Although the embodiment is described as practical matter with respect to frequencies near the detected candidate frequency, it would be apparent to one skilled the art that the range of selected frequencies could vary widely.

After filtering the stabilized phase history 118, a coherency detector 304 detects a coherent output from the matched filter bank 210 (step 422). Thus, a coherent output 211 which isolates the OSF is finally output (step 424).

An actual vibration frequency 213 is also detected corresponding to the particular phase rotation in the matched filter bank 210 resulting in the coherent, isolated OSF output 211 (step 426). This detected actual vibration frequency 213 is then output to verify or supersede the candidate offset vibration frequency 207 detected previously by detector 206 (step 428).

Third Embodiment: Isolate OSF—Aliasing

The above first and second embodiments essentially determine a candidate frequency of a vibrating target modulo the pulse rate frequency. The second embodiment further filters the stabilized phase history based on the determined candidate frequency, but does not provide a specific filtering phase rotation to discriminate vibrators aliasing at the same frequency.

The inventors have discovered that different vibrators which vibrate at multiples of the radar system folding frequency can alias at the same frequency making it difficult to distinguish between their frequency spectra. The actual vibration frequency and characteristic vibration of such targets cannot be determined then with certainty from the detected frequency spectra alone.

The inventors have further discovered, however, that vibrating targets which alias at the same frequency in their radar return signal can be distinguished by applying a proper phase rotation to the stabilized radar return signal. In particular, the inventors have discovered that filtering the stabilized phase history at the detected candidate vibration frequency and at the candidate vibration frequency plus or minus multiples of the carrier signal folding frequency produces a distinctive coherent output. This singular coherent output allows any aliasing in the frequency spectra to be discriminated. In particular, the coherent output isolates the OSF of the vibrating target regardless of aliasing. The actual vibration frequency of the target can also be determined from the specific phase rotation which produces the coherent output regardless of aliasing.

The operation and advantages of a third embodiment of the present invention to distinguish such aliasing vibrators will become even more clear in the following explanation of FIGS. 5 to 10.

Figure 5:
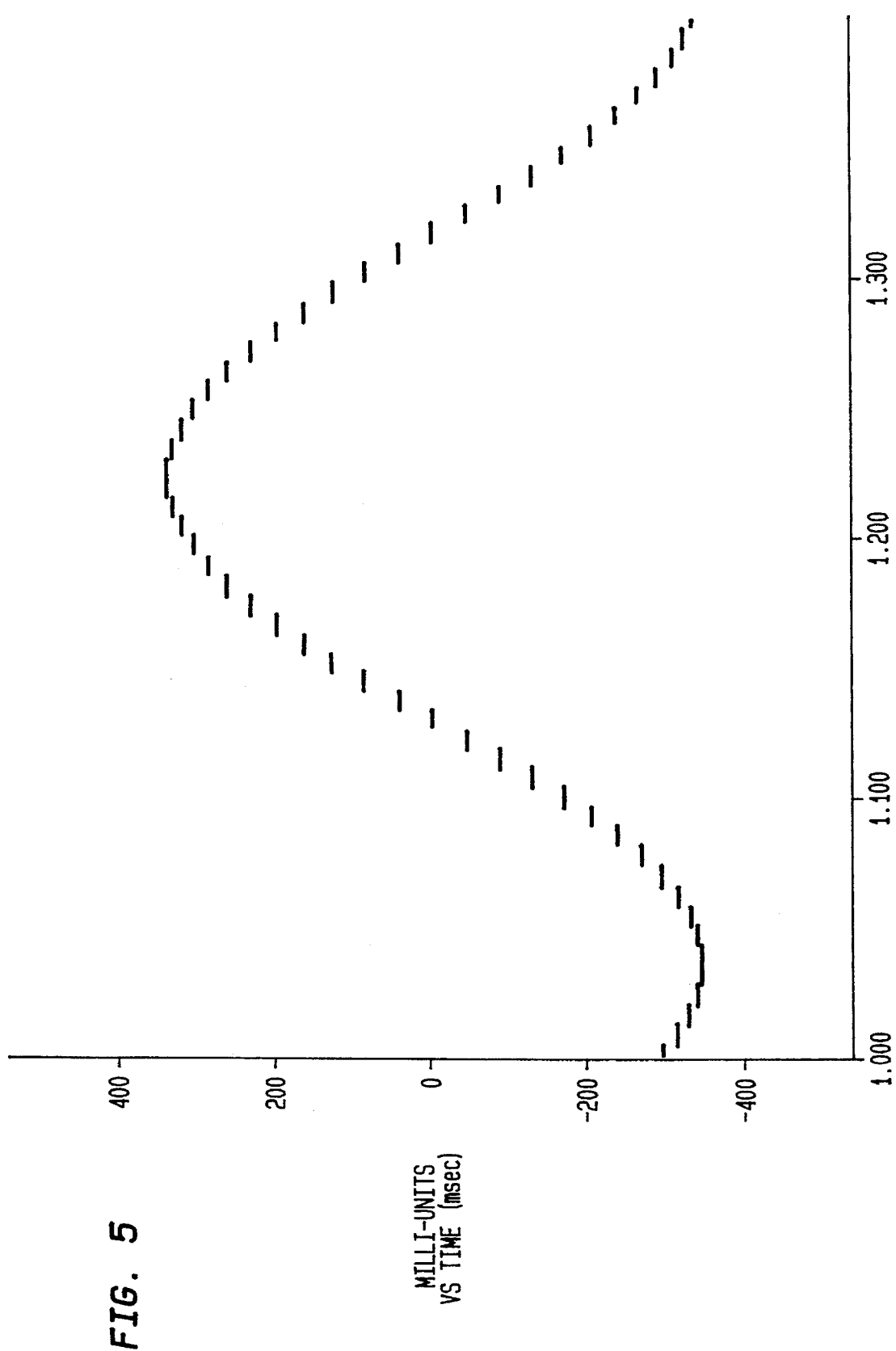
FIG. 5 illustrates the oscillation signature function of a target vibrating at 40 hertz.
Figure 6:
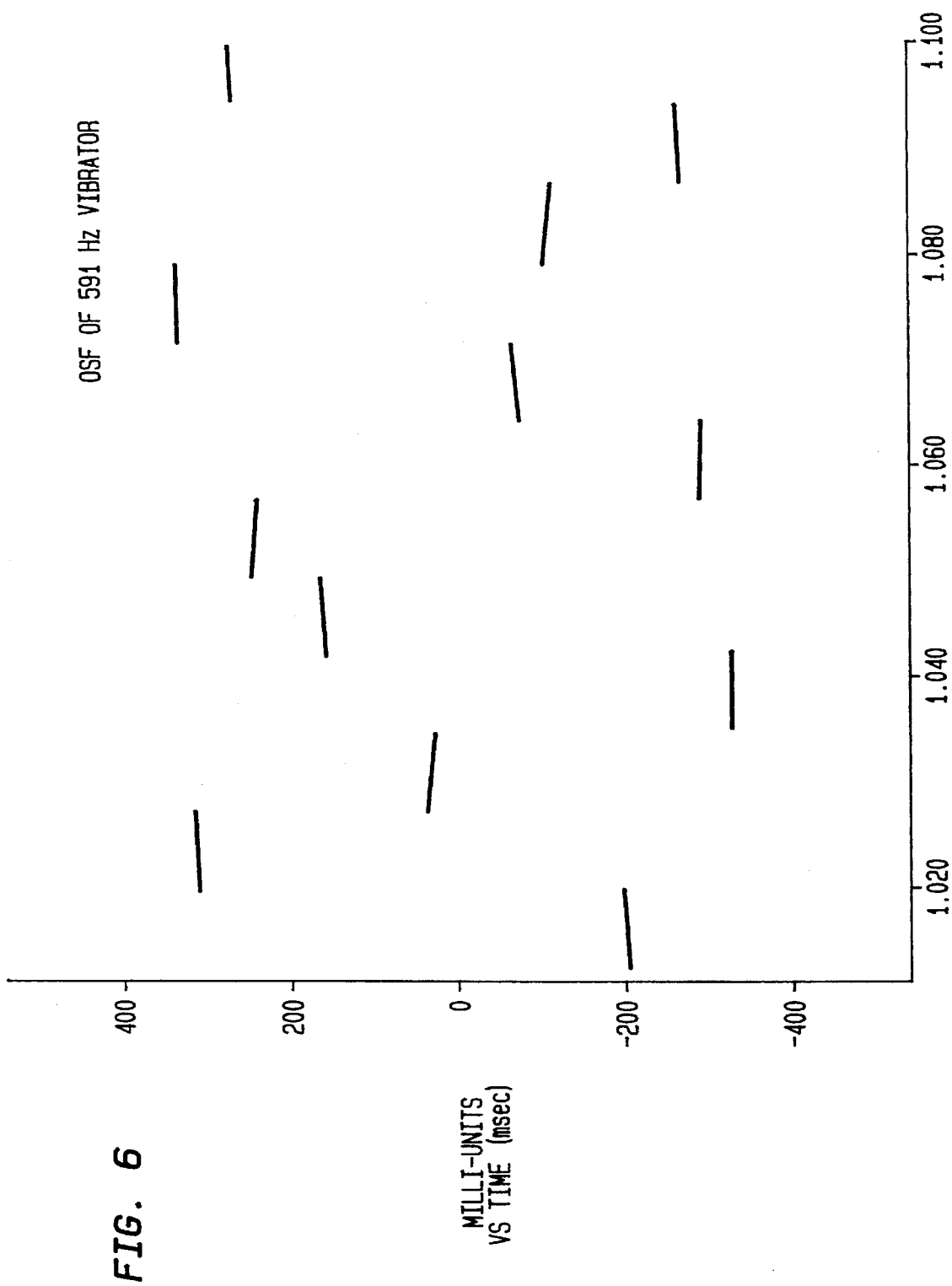
FIG. 6 illustrates the oscillation signature function of a target vibrating at 591 hertz.
Figure 7:
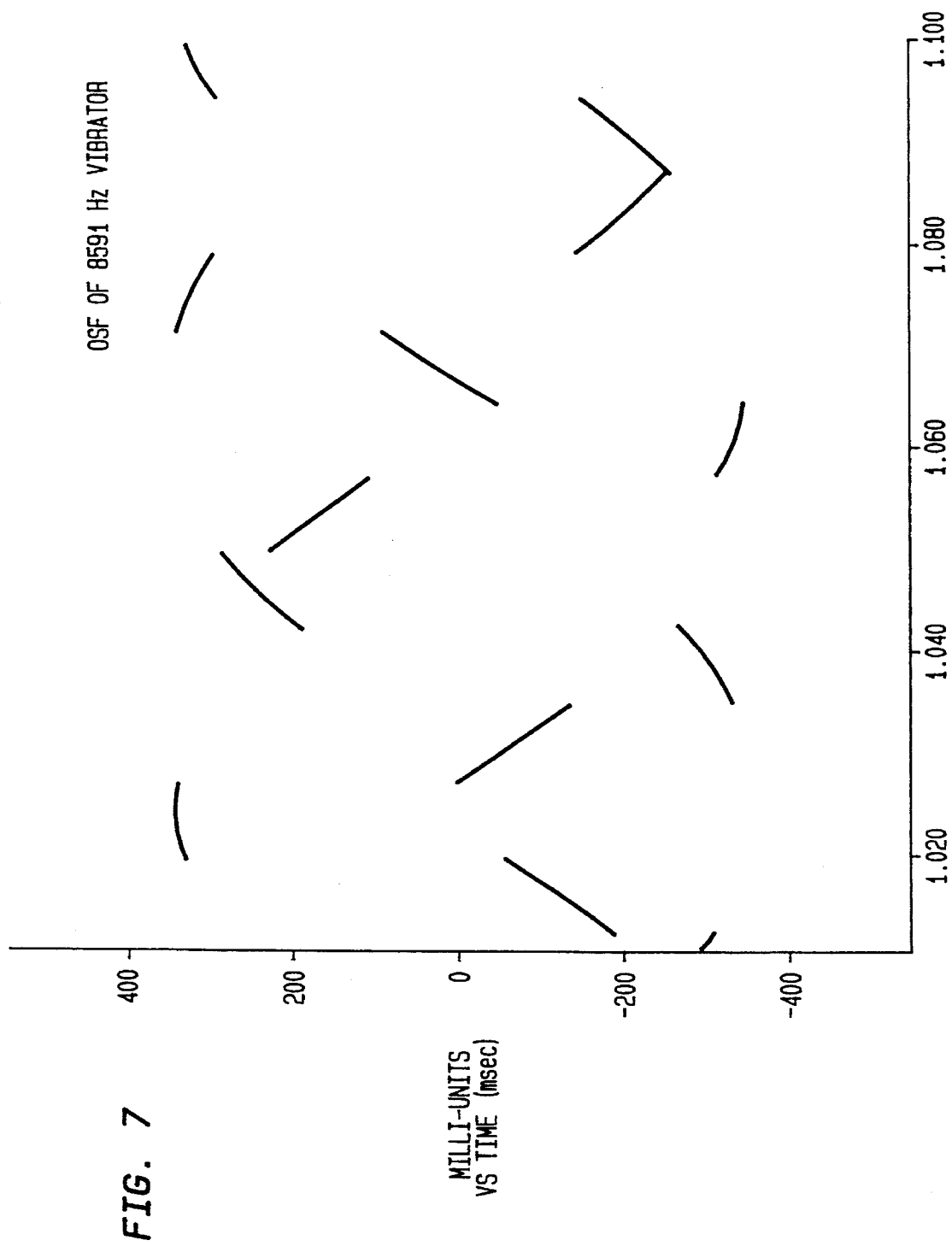
FIG. 7 illustrates the oscillation signature function of a target vibrating at 8591 hertz.

FIGS. 5, 6 and 7 show, respectively, the oscillation signature function of a 40 Hz, 591 Hz and 8591 Hz vibrator. The OSF is a sampled version of the vibration function of the vibrating target. In the examples of FIGS. 5 to 7, the sample rate of the OSF is a pulse rate frequency of 2000 pulses per second. Each pulse is then sampled by an analog-to-digital converter at a frequency of 14.4 megahertz MHz. Therefore, each 7.5 microsecond pulse of the OSF is sampled 108 times. The resulting waveform resembles the output of a sample and hold interpolator.

Figure 8:
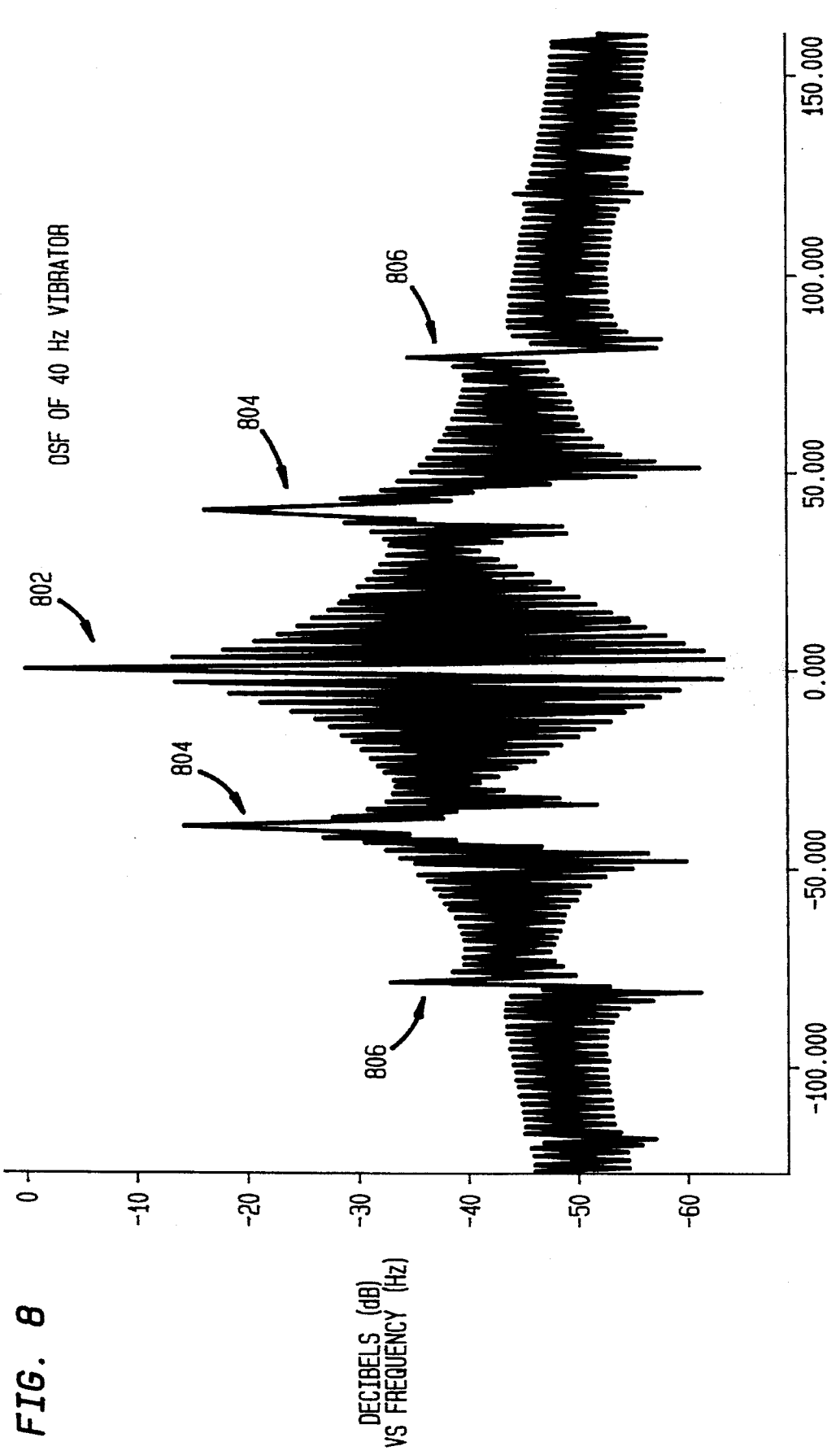
FIG. 8 illustrates the frequency spectrum of the oscillation signature function of the target vibrating at 40 hertz shown in FIG. 5.

FIG. 8 is the frequency spectrum of the OSF of a 40 Hz vibrating target. The DC component 802 of the OSF is the imaged "resting" reflector. The main harmonic frequency components 804 are the FM sidebands resulting from the vibration on the reflector. Harmonic frequency components 806 are the second sidebands of the FM modulation and contain no additional information. Main frequency component 804 is located at the vibration frequency mod the PRF of the radar system.

Figure 9:
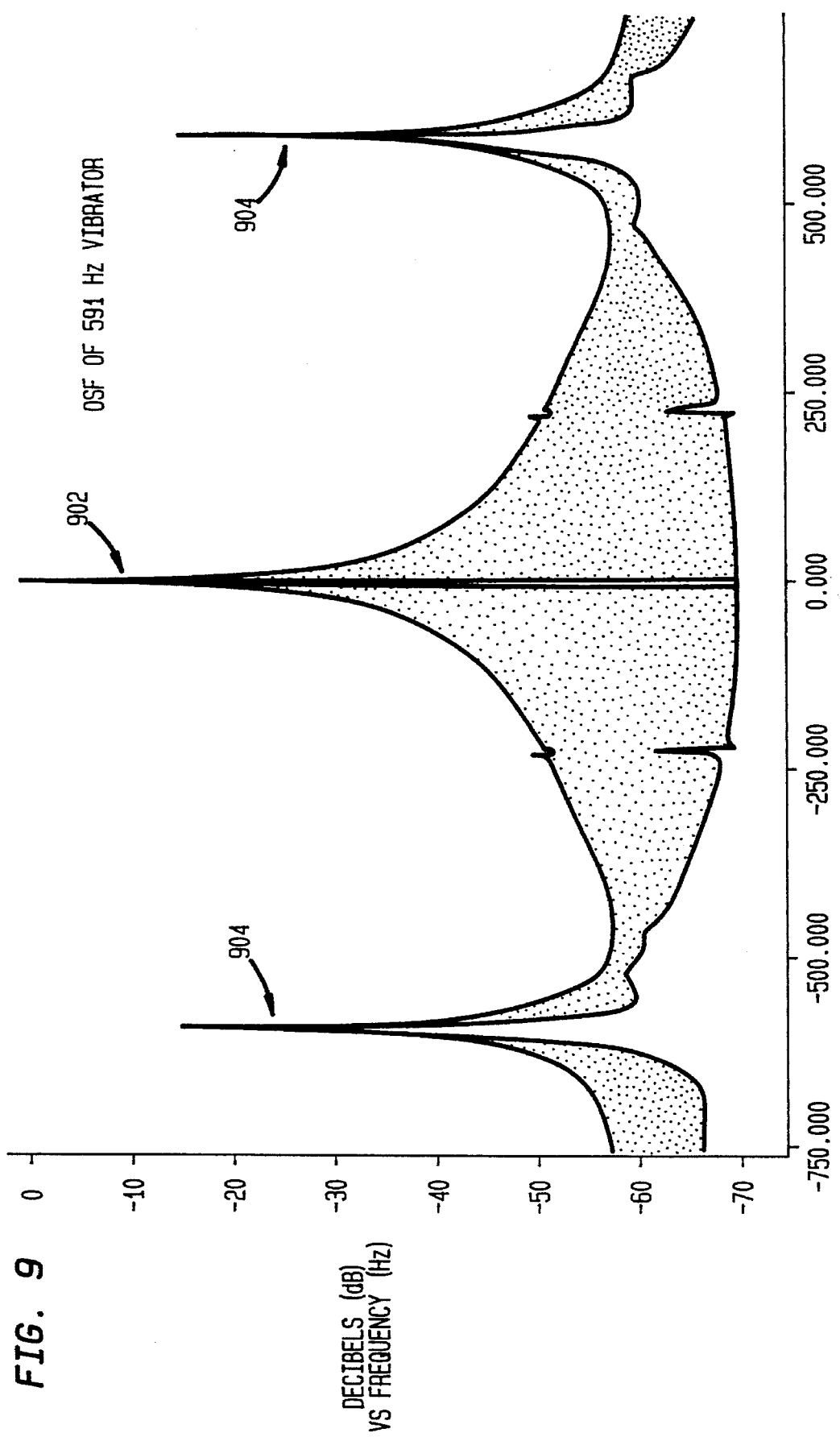
FIG. 9 illustrates the frequency spectrum of the oscillation signature function of the target vibrating at 591 hertz shown in FIG. 6.
Figure 10:
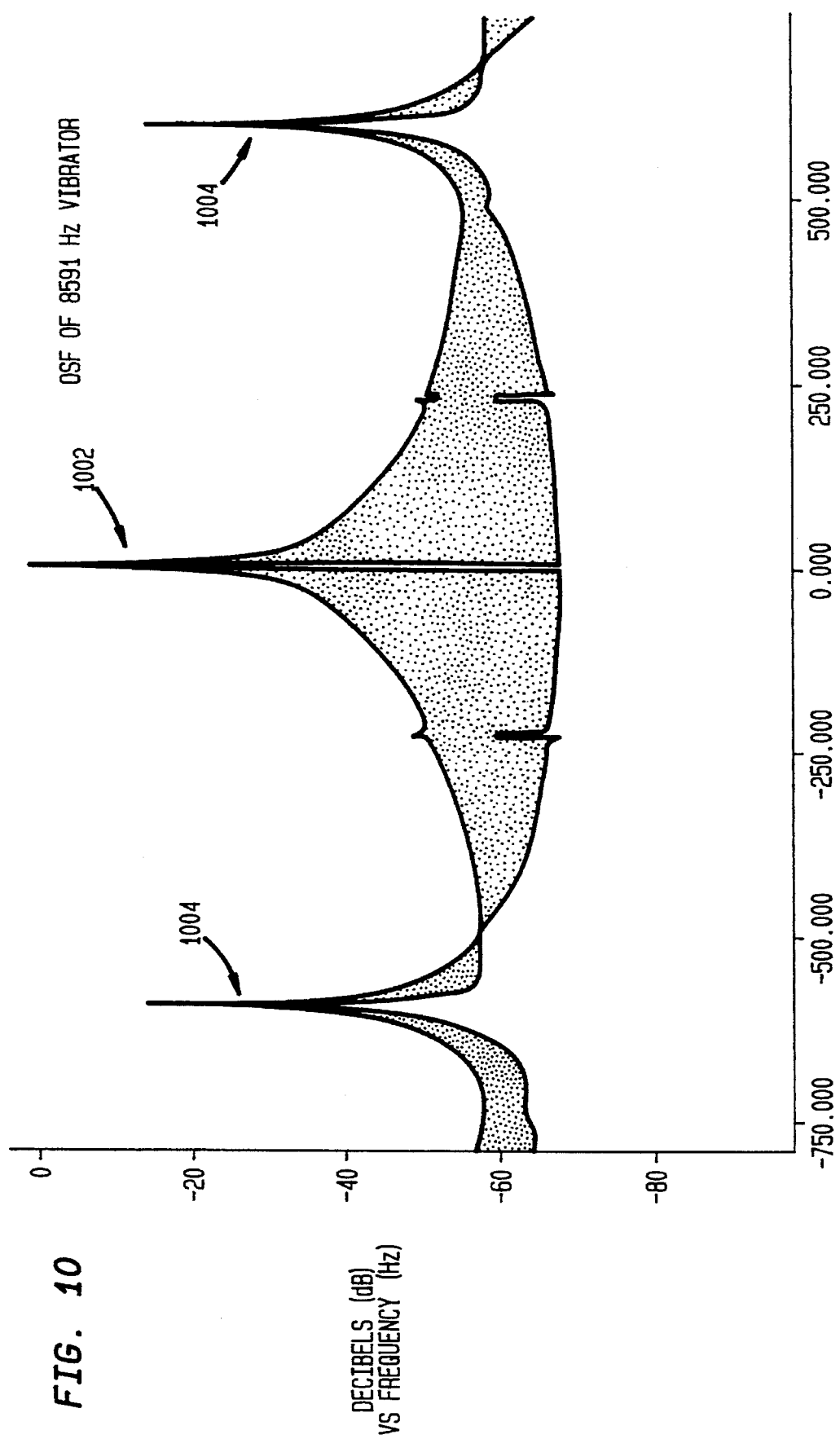
FIG. 10 illustrates the frequency spectrum of the oscillation signature function of the target vibrating at 8591 hertz shown in FIG. 7.

FIGS. 9 and 10 are the frequency spectrums of a 591 Hz vibrating target and a 8591 Hz vibrating target, respectively. In FIG. 9, FM vibration sidebands 904 are symmetrically offset at 591 Hz from the DC peak 902. Likewise, in FIG. 10, FM vibration sidebands 1004 are symmetrically offset at 591 Hz from the DC peak 1002. As discussed above, for a pulse rate frequency or folding frequency of 2 kHz the frequency spectrums of these 591 Hz and 8591 Hz vibrators appear to be identical due to aliasing.

The inventors have recognized that although the frequency spectrum of the 591 Hz 8591 Hz vibrating target are nearly identical (see FIGS. 9 and 10), the oscillation signature function waveforms are not identical (compare FIGS. 6 and 7). In particular, there is a known phase rotation between the last sample of a dechirped return radar pulse n and the first sample of a dechirped return radar pulse n+1. As evident from the slopes of the waveforms in FIGS. 6 and 7, this phase rotation is different for different vibration frequencies even when the frequency spectrums appear identical. Accordingly, when the correct phase rotation corresponding to the actual vibration frequency is applied to an amplified OSF in a stabilized phase history 118, the resulting waveform is coherent, or phase continuous.

Accordingly, the third embodiment of the present invention is similar to the second embodiment discussed above, except that the matched filter bank 210 is further programmed to perform phase rotations at the detected candidate vibration frequency 207 plus or minus multiples of the carrier signal folding frequency. The operation of signal processing block 201, according to the third embodiment, will now be described with reference to the Isolate OSF—Aliasing Routine 430 in FIG. 4C.

First, calculator 208 receives the offset frequency 207 determined by detector 206, as described previously with respect to the first embodiment. Calculator 208 then calculates filter phase rotations at the determined offset frequency 207 and at the detected offset vibration frequency 207 plus or minus multiples of the carrier signal folding frequency (step 432). In step 434, the stabilized phase history 118 is filtered at the phase rotations calculated in previous step 432.

In a matched filter bank 210 as shown in FIG. 3, step 434 can be carried out by programming each match filter 302 with a coefficient 209 to perform a phase rotation on the stabilized phase history 118 at the offset vibration frequency 207 and at the offset vibration frequency 207 plus or minus multiples of the folding frequency.

For example, if the candidate vibration frequency, i.e. the offset frequency 207 from DC to the nearest symmetric FM sideband, is 591 Hz and the folding frequency is 2 kHz, then the phase rotation of the matched filters would correspond to the expected phase rotation for signals having assumed vibration frequencies at 591 Hz, 2591 Hz, 4591 Hz, 6591 Hz, etc. In this manner, each matched filter 302 phase rotates the OSF based on an expected phase rotation for an assumed candidate vibration frequency taking into account potential aliasing by vibrators which vibrate at multiples of the folding frequency.

If the assumed frequency of a particular matched filter 302 is correct, then the output of that matched filter is coherent. Thus, if the radar has detected a vibrating target, then one matched filter 302 has a coherent output at a phase rotation corresponding to the actual vibration frequency, while the other matched filter 302 outputs are non-coherent. The matched filter 302 with the coherent output, therefore, indicates the actual vibration frequency 213 of the target.

The coherent output of the matched filter 302 that corresponds to the actual vibration frequency 213 is the isolated characteristic vibration or oscillation signature function (OSF) of the target. Therefore, after filtering the stabilized phase history 118, a coherency detector 304 detects a coherent output from the matched filter bank 210 (step 436).

In step 438, the isolated OSF 211 is output from OSF detector 114. An actual vibration frequency 213 is also detected corresponding to the particular phase rotation in the matched filter bank 210 resulting in the coherent, isolated OSF output 211 (step 440). This detected actual vibration frequency 213 is then output to verify or supersede the candidate offset vibration frequency 207 detected previously by detector 206 (step 442).

Regarding the coherency detector 304, a narrowband filter can be used to detect which matched filter output signal is coherent. A coherent, or phase continuous signal, has a narrowband frequency spectrum while a non-coherent signal has a broadband frequency spectrum. Thus, non-coherent matched filter 302 outputs will have a broadband frequency spectrum. If none of matched filters 302 have a narrowband output, then the radar system has not detected a vibrating target.

The filtering in step 434 can be performed in parallel by using N matched filters 302, as shown in the example of FIG. 3. It would be apparent to a person skilled in the art, however, that the stabilized phase history 118 could be stored and then filtered at a phase rotation corresponding to the candidate offset frequency 207. Filtering at the other calculated candidate frequencies—the offset vibration frequency 207 plus or minus multiples of the folding frequency—would then be performed, if necessary, until a coherent output is detected.

In addition, the isolated OSF 211 can be further compared against predetermined sample information to determine characteristic information regarding the vibrating target, such as the type of vibrating target, the identity of the vibrating target, and/or the status of the vibrating target.

Thus, according to the third embodiment of the present invention, by using matched filter detection even vibrating targets which alias at the same offset frequency can be distinguished and their actual frequency and characteristic vibration can be detected. Further, this detection can occur prior to imaging the stabilized phase history 118.

The OSF detector 114 including each of its respective constituent components shown in FIGS. 2 and 3 and the routines in FIGS. 4A to 4C, can be implemented using hardware, software executed by a CPU, or a hardware/software combination. Thus, it would be apparent to one skilled in the art, that each of the lowpass filter 202, decimator 204, detector 206, calculator 208, matched filter bank 210, and coherency detector 304 can be implemented as hardware, software executed by a CPU, or a hardware/software combination.

3. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for determining a vibration frequency of a vibrating target comprising the steps of:

detecting a frequency sideband in a stabilized phase history of a reflected return signal, said frequency sideband representing modulation imparted by the vibrating target; and determining said vibration frequency of the vibrating target based on said detected frequency sideband, comprising the steps of:

determining an offset vibration frequency from DC of said detected frequency sideband, and filtering said stabilized phase history at a phase rotation corresponding to said offset vibration frequency to isolate a characteristic vibration and to verify that said offset vibration frequency is an actual vibration frequency of said vibrating target.

2. The method according to claim 1, wherein said offset vibration frequency constitutes a candidate vibration frequency of said vibrating target and said filtering step filters said stabilized phase history at a phase rotation corresponding to said candidate vibration frequency and at other selected phase rotations corresponding to other potential vibration frequencies; and further comprising the step of detecting a coherent signal after said filtering, said coherent signal being representative of characteristic vibration of said vibrating target at a phase rotation corresponding to the actual vibration frequency of the vibrating target.

3. The method according to claim 1, wherein said offset vibration frequency constitutes a candidate vibration frequency of said vibrating target and said filtering step filters said stabilized radar return signal at phase rotations corresponding to said candidate vibration frequency and to said candidate vibration frequency plus or minus multiples of a folding frequency associated with a carrier signal in said reflected return signal; and further comprising the step of detecting a coherent signal after said filtering, said coherent signal being representative of characteristic vibration of said vibrating target at a phase rotation corresponding to the actual vibration frequency of the vibrating target, whereby, said characteristic vibration and said actual vibration frequency of the vibrating target are detected regardless of whether the vibrating target has aliased at the offset vibration frequency.

4. The method according to claim 1, wherein said vibration frequency is determined from said stabilized phase history prior to imaging.

5. A method for isolating a characteristic vibration of a vibrating target comprising the steps of:

detecting a frequency sideband in a stabilized phase history of a reflected return signal, said frequency sideband representing modulation imparted by the vibrating target;

determining at least one candidate vibration frequency based on said frequency sideband; and filtering said stabilized phase history at a phase rotation corresponding to an actual vibration frequency of the vibrating target to isolate said characteristic vibration of the vibrating target, said filtering being based on said at least one candidate vibration frequency determined in said determining step.

6. The method according to claim 5, further comprising the step of comparing said isolated characteristic vibration with predetermined characteristic vibration information, whereby, at least one of the vibrating target type, identity, or state of vibration can be recognized.

7. A method according to claim 5, wherein said determining step further comprises determining a candidate vibration frequency comprising an offset vibration frequency from DC of said detected frequency sideband and said filtering step distinguishes between vibrating targets which alias at said offset vibration frequency by filtering said stabilized radar return signal at phase rotations corresponding to said candidate vibration frequency and to said candidate vibration frequency plus or minus multiples of a predetermined folding frequency associated with a carrier signal in said reflected return signal.

8. A signal processor for determining the vibration frequency of a vibrating target from a stabilized phase history of a return signal reflected from the vibrating target comprising:

means for detecting a frequency sideband in said stabilized phase history, said detected frequency sideband representing modulation imparted by the vibrating target; and means for determining said vibration frequency of the vibrating target based on said frequency sideband detected by said frequency sideband detecting means, wherein said vibration frequency determining means comprises:

means for determining all offset vibration frequency from DC of said detected frequency sideband: and means for filtering said stabilized phase history at a phase rotation corresponding to said offset vibration frequency to isolate a characteristic vibration and to verify that said offset vibration frequency is an actual vibration frequency of said vibrating target.

9. The signal processor according to claim 8, wherein said frequency sideband detecting means comprises:

means for low pass filtering said stabilized phase history at a bandwidth substantially equal to a pulse repetition frequency of a carrier signal in said reflected return signal, and providing an output signal representative thereof;

means for decimating said output signal from said low pass filtering means at a sampling rate substantially equal to said pulse repetition frequency and providing a decimated signal representative thereof; and means for detecting an FM vibration sideband in said decimated signal.

10. The signal processor according to claim 8, wherein said vibration frequency determining means further comprises means for filtering said stabilized phase history at a phase rotation corresponding to said offset vibration frequency to isolate a characteristic vibration and to verify that said offset vibration frequency is the actual vibration frequency of said vibrating target.

11. The signal processor according to claim 8, wherein said offset vibration frequency constitutes a candidate vibration frequency of said vibrating target and said filtering means filters said stabilized phase history at a phase rotation corresponding to said candidate vibration frequency and at other selected phase rotations corresponding to other potential vibration frequencies; and further comprising means for detecting a coherent signal output from said filtering means, said coherent signal being representative of characteristic vibration of said vibrating target at a phase rotation corresponding to the actual vibration frequency of the vibrating target.

12. The signal processor according to claim 8, wherein said offset vibration frequency constitutes a candidate vibration frequency of said vibrating target and said filtering means filters said stabilized phase history at phase rotations corresponding to said candidate vibration frequency and to said candidate vibration frequency plus or minus multiples of a folding frequency associated with a carrier signal in said reflected return signal; and further comprising means for detecting a coherent signal output from said filtering means, said coherent signal being representative of characteristic vibration of said vibrating target at a phase rotation corresponding to the actual vibration frequency of the vibrating target, whereby, said characteristic vibration and said actual vibration frequency of the vibrating target are detected regardless of whether the vibrating target has aliased at the offset vibration frequency.

13. The signal processor according to claim 12, wherein said filtering means comprises:

a calculator means for calculating filter coefficients corresponding to said candidate vibration frequency and to said candidate vibration frequency plus or minus multiples of said folding frequency; and a matched filter bank means comprising a plurality of filters for filtering said stabilized phase history at phase rotations according to said filter coefficients calculated by said calculator means.

14. The signal processor according to claim 8, wherein said stabilized phase history is provided by a radar system prior to imaging said stabilized phase history.

15. A detection system for isolating a characteristic vibration of a vibrating target comprising:

a receiver means for providing a stabilized phase history of a return signal reflected from said vibrating target;

means for detecting a frequency sideband in said stabilized phase history provided by said receiver means, said frequency sideband representing modulation imparted by the vibrating target;

means for determining at least one candidate vibration frequency based on said frequency sideband detected by said detecting means; and means for filtering said stabilized phase history at a phase rotation corresponding to an actual vibration frequency of the vibrating target based on said at least one candidate vibration frequency determined by said candidate vibration frequency means to isolate said characteristic vibration.

16. The detection system according to claim 15, wherein said detection system is a radar system and said receiver means is a radar receiver receiving a reflected radar return signal.

17. The detection system according to claim 15, further comprising means for comparing said isolated characteristic vibration with predetermined characteristic vibration information, whereby, at least one of the vibrating target type, identity, or state of vibration can be recognized.

18. The radar system according to claim 15, wherein said frequency sideband detecting means detects an FM vibration sideband;

said candidate vibration frequency determining means determines an offset vibration frequency from DC of said FM vibration sideband; and said filtering means discriminates between vibrating targets which alias at said offset vibration frequency by filtering said stabilized phase history at phase rotations corresponding to said offset vibration frequency and to said offset vibration frequency plus or minus multiples of a folding frequency associated with a carrier signal in said stabilized phase history.

19. An oscillation signature function detector for isolating an oscillation signature function of a vibrating target imparted on a reflected return signal comprising:

low pass filter means for receiving a stabilized complex phase history which includes said oscillation signature function, filtering said stabilized complex phase history at a bandwidth substantially equal to a pulse repetition frequency associated with a carrier signal in said reflected return signal, and providing an output representative thereof;

decimator means for decimating said output signal from said low pass filter means at a sampling rate substantially equal to said pulse repetition frequency and providing an output signal representative thereof;

detecting means for processing said output signal from said decimator means to detect an FM vibration sideband corresponding to the oscillation signature function imparted by the vibrating target and to determine a candidate vibration frequency by detecting an offset vibration frequency from DC of said detected FM vibration sideband;

calculator means for calculating matched filter coefficients based on said candidate vibration frequency and at least one multiple of a folding frequency associated with said carrier signal pulse repetition frequency;

matched filter means for performing phase rotations on said stabilized phase history based on said respective matched filter coefficients calculated by said calculator means; and coherency detector means for detecting a coherent, phase continuous output signal from said matched filter means to isolate said oscillation signature function.

20. A vehicle mounted detection system for isolating a characteristic vibration of a vibrating target comprising:

a receiver means for providing a stabilized phase history of a return signal reflected from said vibrating target, said receiver means being mounted on a vehicle;

means for detecting a frequency sideband in said stabilized phase history provided by said receiver means, said frequency sideband representing modulation imparted by the vibrating target;

means for determining at least one candidate vibration frequency based on said frequency sideband detected by said detecting means; and means for filtering said stabilized phase history at a phase rotation corresponding to an actual vibration frequency of the vibrating target based on said at least one candidate vibration frequency determined by said candidate vibration frequency means to isolate said characteristic vibration.

21. The vehicle mounted system according to claim 20, further comprising means for comparing said isolated characteristic vibration with predetermined characteristic vibration information, whereby, at least one of the vibrating target type, identity, or state of vibration can be recognized.

22. The vehicle mounted system according to claim 20, wherein said vehicle comprises an aircraft for detecting vibrating ground targets.

\* \* \* \* \*